United States Patent
Bridges et al.

[19]

[11] Patent Number: 6,112,416
[45] Date of Patent: Sep. 5, 2000

[54] WEED AND GRASS TRIMMER ATTACHMENT HEAD

[76] Inventors: Roy Bridges, 13165 Welcome Way, Reno, Nev. 89511; David Harris, 1501 Pacific Ave., Rio Oso, Calif. 95674; Karl Hymmen, 13350 Mahogany Dr., Reno, Nev. 89511

[21] Appl. No.: 09/213,303

[22] Filed: Dec. 15, 1998

Related U.S. Application Data

[60] Provisional application No. 60/069,940, Dec. 16, 1997.

[51] Int. Cl.[7] .............................. A01D 34/82; B26B 5/00; B26D 27/00; B26D 9/02
[52] U.S. Cl. ................................ 30/276; 30/300; 56/12.7; 56/295
[58] Field of Search ............................. 30/276, 347, 300; 56/12.7, 255, 295; 83/698.41, 698.11

[56] References Cited

U.S. PATENT DOCUMENTS

| | | | |
|---|---|---|---|
| 4,183,196 | 1/1980 | Oosterling et al. | 56/295 |
| 4,856,194 | 8/1989 | Lee | 30/276 |
| 5,430,943 | 7/1995 | Lee | 30/347 |
| 5,617,636 | 4/1997 | Taggett et al. | 30/276 |
| 5,622,035 | 4/1997 | Kondo et al. | 56/12.7 |
| 5,640,836 | 6/1997 | Lingerfelt | 56/255 |
| 5,722,172 | 3/1998 | Walden | 30/347 |
| 5,836,227 | 11/1998 | Dees, Jr. et al. | 30/276 |
| 5,852,876 | 12/1998 | Wang | 30/276 |
| 5,890,352 | 4/1999 | Molina | 56/12.7 |

*Primary Examiner*—Rinaldi I. Rada
*Assistant Examiner*—Boyer Ashley
*Attorney, Agent, or Firm*—Limbach & Limbach L.L.P.

[57] ABSTRACT

A vegetation trimmer attachment head includes a main body, a plurality of elongated blades extending radially outward therefrom, and pins to pivotably attach the blades to the main body. A single pin cover mates with the main body to retain the pins in place. The pin cover is held in place by being interposed between the main body and the vegetation cutting device. The attachment head is simple and can be quickly disassembled and reassembled without tools because it has few parts, none of which are threaded or snap together.

5 Claims, 3 Drawing Sheets

WEED AND GRASS TRIMMER ATTACHMENT HEAD

This application claims the benefit of U.S. Provisional Application No. 60/069,940, filed Dec. 16, 1997, and entitled Improved Weed And Grass Trimmer Attachment Head.

BACKGROUND OF THE INVENTION

1. Field of the Invention

The present invention relates to vegetation rotary cutting devices, and in particular to a cutting head for attachment to various brands of such devices.

2. Discussion of the Prior Art

Many manufacturers provide rotary cutting devices for cutting and trimming lawns, weeds, underbrush and the like. These devices typically use a string or line that rotates at a high rate of speed at the end of an elongated, hand-held device. The devices are typically powered by a gasoline engine for professional use, or an electric motor for use by home owners.

Due to the widespread use of such trimming devices, a market has emerged for third parties to supply replacement line and accessory cutting heads for the equipment owners. These replacement items offer advantages not found in the parts supplied by the original equipment manufacturers. For instance, the replacement items offered by third party suppliers cost less partly because of the high volumes afforded by a single accessory fitting many different brands and styles of trimmers. Third party suppliers have advanced trimmer technology by designing more efficient cross-sections on trimmer lines, and by providing serrated plastic blades for replacing trimmer lines to improve cutting performance. New attachment heads offer greater simplicity and ease of use.

Each of the serrated plastic blades of previously existing attachment heads is pivotably secured to the main body of the attachment head by a steel shoulder screw and lock nut. For example, please see U.S. Pat. No. 5,430,943 issued to Anthony L. Lee on Jul. 11, 1995, incorporated herein by reference. While this arrangement provides a secure means for fastening the blades, the shoulder screws and nuts are relatively expensive. This attachment method requires significant assembly time during manufacture, further increasing costs. The end user must take extra time and use tools when removing and installing blades. Even with lock nuts, the possibility of the shoulder screws loosening during operation exists, especially if not properly tightened by the user.

What is needed and is not provided by the prior art is a trimmer attachment head which provides a simple, inexpensive and reliable means for securing plastic blades to the main body of the head, enabling the user to change blades quickly without the need for tools.

SUMMARY OF THE INVENTION

A trimmer attachment head constructed according to the preferred embodiment of the present invention includes a main body adapted for rotary motion when attached to the spindle of a trimmer device. The main body has serrated blades pivotally attached to it around the periphery of the main body. Each blade is attached at one end with a shoulder pin which is received within a bore in the main body. A pin cover or protector is placed over all of the pins to secure them in place. The pin protector is held in place by being sandwiched between the main body and the trimmer device when the trimmer attachment head is mounted on the spindle of the trimmer device.

The inventive head is reliable since it has few parts and utilizes metal pins to retain the blades. During use the pins are not able to rattle loose or collect debris because they are enclosed by the pin protector. The low number and simplicity of the parts yields a head that is low cost and easy to assemble and disassemble. Since no threaded fasteners are used on the head, no tools are required for assembly or disassembly.

DETAILED DESCRIPTION OF THE PREFERRED EMBODIMENT

Figure 1:
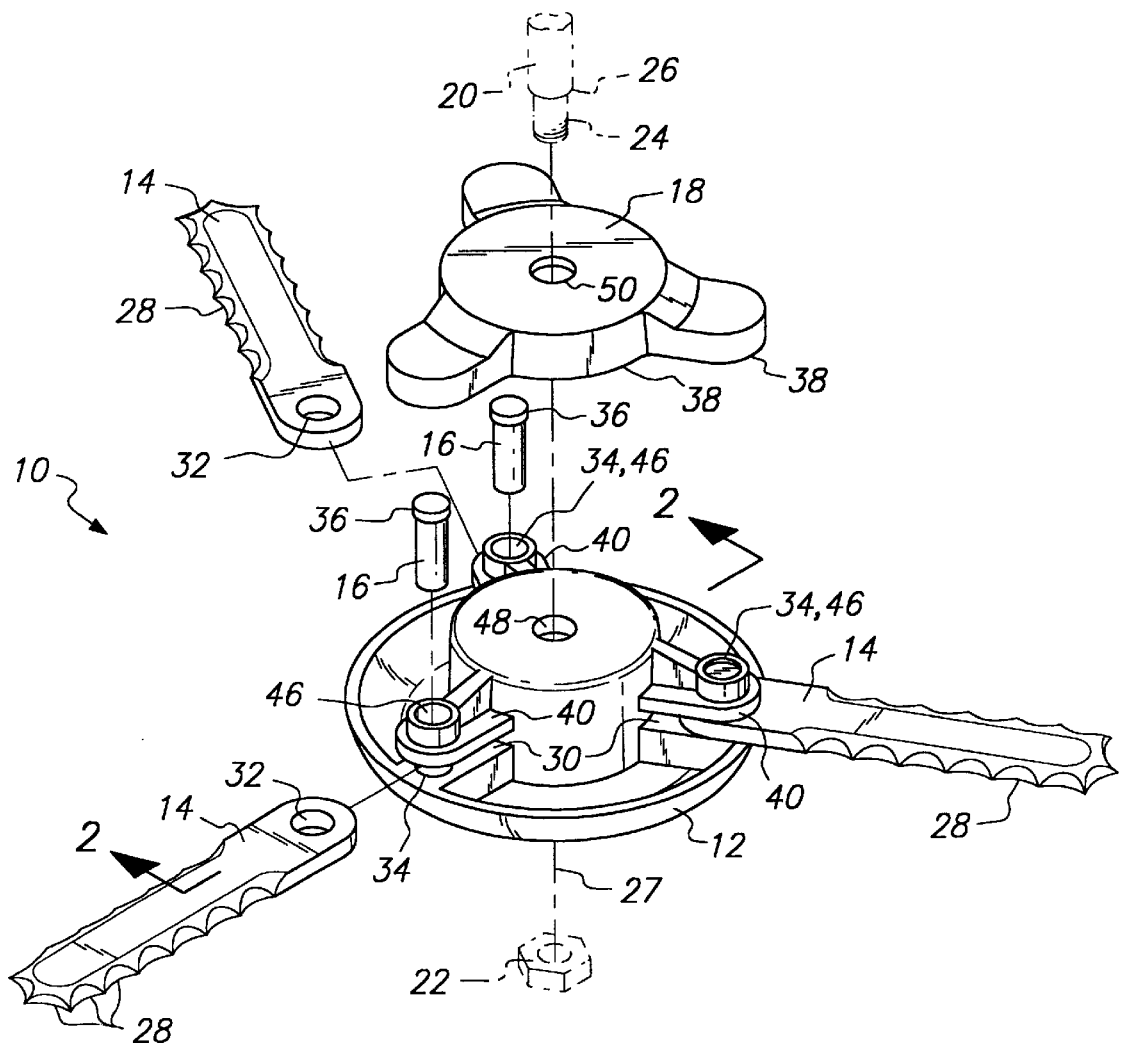
FIG. 1 is an exploded perspective view showing a trimmer head constructed according to the present invention.

Referring to FIG. 1, a trimmer attachment head 10 constructed according to the present invention is shown. Trimmer head 10 includes a main body 12, three blades 14, three pins 16, and a pin cover or protector 18. Trimmer head 10 is assembled as indicated by the dashed lines in FIG. 1 and as will be more fully described below. The assembled trimmer head 10 is placed over trimmer spindle 20 and secured in place by nut 22. The spindles of other types of weed trimmers (not shown) have internal threads rather than external threads 24 as shown, and therefore utilize a bolt instead of nut 22 to secure the trimmer attachment head 10 to the trimmer.

Once trimmer attachment head 10 is tightly sandwiched between spindle shoulder 26 and nut 22, rotary power can be transmitted from the trimmer unit through spindle 20 to rotate trimmer head 10 about the longitudinal axis 27 of spindle 20. During operation, blades 14 extend radially outward to perform the intended cutting of vegetation.

Blades 14 preferably are made of plastic and have serrations 28. The distal ends of blades 14 reside in main body slots 30, and have holes 32 therethrough. Corresponding holes 34 in main body 12 align with blade holes 32 during assembly. Pins 16 are received within associated holes 34 and 32 to pivotally retain blades 14 on main body 12. Pins 16 are preferably made of steel and have enlarged head portions 36 to prevent them from falling through holes 34 in main body 12. The pins could also be made of plastic.

Pin protector 18 is placed over main body 12 after pins 16 are installed to cover pins 16 and prevent them from falling out. Peripheral lip 38 is formed on pin protector 18 to firmly engage wings 40 on main body 12. This engagement prevents rotation of pin protector 18 relative to main body 12. No extra parts or assembly steps are required to secure pin protector 18 to main body 12, as pin protector 18 is securely sandwiched between main body 12 and spindle 20 when trimmer head 10 is mounted on the trimmer. With this arrangement, all of the pins 16 are held in place by a single piece, and this single pin protector 18 can be installed easily without tools by simply placing it over the top of main body 12.

Figure 2:
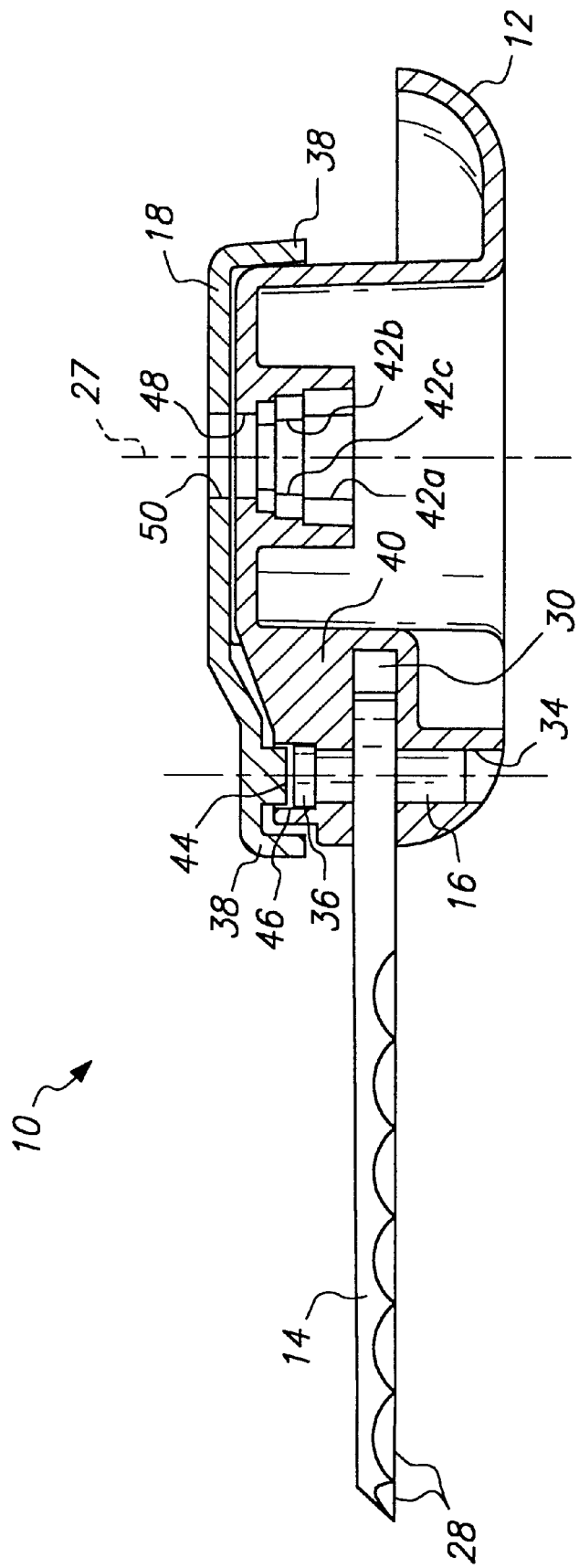
FIG. 2 is a side-elevation cross-sectional view taken along line 2—2 in FIG. 1.

Referring to FIG. 2, a cross-section of trimmer head 10 is shown. Preferably, pin protector 18 fits over the top of main body 12 loosely enough so that the pin protector can be easily installed or removed, but snugly enough so that there is not rattling. Cylindrical bosses 44 fit down into counterbores 46 to further secure pins 16 and pin protector 18 to main body 12. Preferably, there is little or no gap between the head 36 of pin 16 and boss 44. Because pins 16 and counterbores 46 are completely covered by pin protector 18, vegetation clippings and debris do not accumulate in this area to hamper the assembly or disassembly of trimmer head 10.

Figure 3:
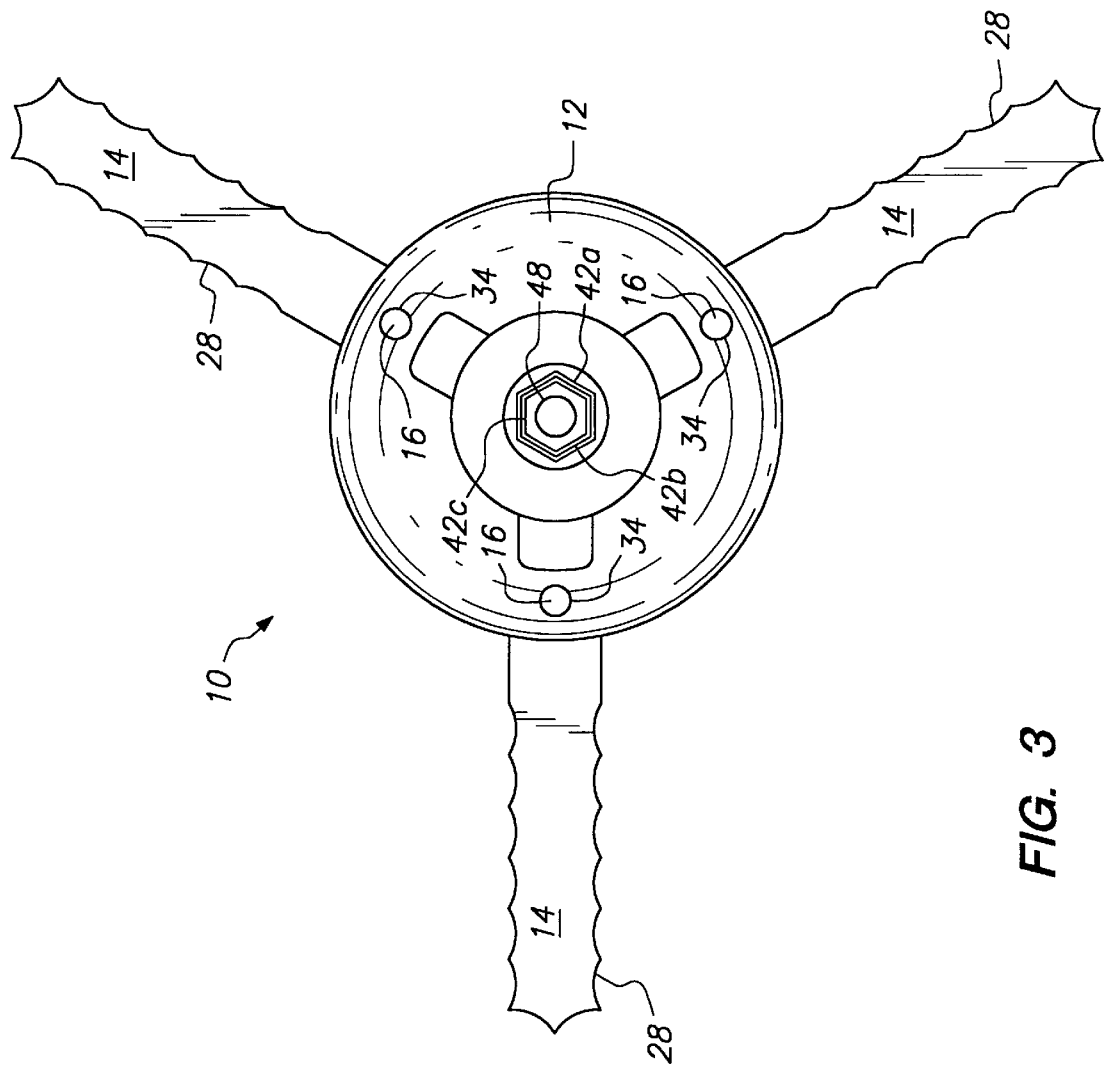
FIG. 3 is a bottom view of the trimmer head.

Referring to FIGS. 2 and 3, the attachment means of the preferred embodiment will be described. Three hexagonally shaped apertures 42a, 42b, 42c are concentrically located on the bottom center of main body 12 for alternately accommodating three different size nuts or bolts to attach trimmer head 10 to the trimmer, as described above. Nut 22 or a bolt can first be inserted into aperture 42 and then trimmer head 10 placed over spindle 20. Threaded portion 24 of spindle 20 (or of the bolt, if one is used) resides in central holes 48 and 50 of main body 12 and pin protector 18, respectively. Nut 22 or the bolt can then be tightened onto spindle 20 by rotating trimmer head 10 in the appropriate direction (typically opposite to the direction of rotation during use.) Depending on the size of the particular nut 22 or bolt, the nut or bolt head will drop into the appropriate aperture 42a, 42b or 42c. With this arrangement, no tools or separate adapter pieces for different sizes of fasteners are needed for attaching trimmer head 10 to the trimmer device.

Disassembly of trimmer head 10 is the reverse of above. Head 10 is removed from trimmer spindle 20 by turning head 10 (in the same direction of normal rotation) to disengage nut 22 or bolt from spindle 20. Trimmer head 10 can then be inverted to allow pin protector 18 and pins 16 to drop out of main body 12. Serrated blades 14 can then slide out of slots 30.

In an alternative embodiment (not shown), a single-size hex aperture 42 is provided for more contact surface area with nut 22 or a bolt head. Preferably, the trimmer head is then provided to the consumer with a variety of sizes of nuts and bolts to fit different makes and models of vegetation trimmers. These non-standard nuts and bolts have the same exterior hex dimensions for mating with aperture 42, such as 9/16 inch.

Although the inventive trimmer attachment head 10 is shown and described with three serrated blades 14, the head can be designed to accommodate any style or number of blades, such as one, two, or more than three blades. Pins 16 can be separate as shown and described, or can be formed on the main body, blades, and/or pin protector. A principal aspect of the invention is that a single piece is placed over the main body to secure all of the pins in place which retain the blades.

The above descriptions and drawings are for illustrative purposes only, and are not exhaustive of possible alternate embodiments of the invention. It is to be understood that the present invention is not limited to the embodiments described above and illustrated herein, but encompasses any and all variations falling within the scope of the appended claims.

What is claimed is:

1. A trimmer attachment head for cutting vegetation comprising:
    a main body removably attachable to a vegetation cutting device, the main body being rotably drivable by the vegetation cutting device about a central rotation axis of the main body, the main body having a first hole offset from the central rotation axis;
    an elongated blade for cutting vegetation, the blade having a distal end and a proximal end, the proximal end having a second hole for axial alignment with the first hole;
    a pin receivable through the first and second holes for pivotably attaching the blade to the main body; and
    a pin cover for retaining the pin in the first and second holes during operation of the trimmer attachment head, the pin cover fitting loosely over the pin so as to constrain the pin axially but not laterally, the pin cover being a separate and detached piece from the main body, the main body, the pin and the pin cover cooperating to allow the blade to be removably attached to the main body quickly without tools, wherein the pin cover includes engagement means for engaging the main body to prevent rotation of the pin cover relative to the main body.

2. A trimmer attachment head for cutting vegetation comprising:
    a main body removably attachable to a vegetation cutting device, the main body being rotably drivable by the vegetation cutting device about a central rotation axis of the main body, the main body having a plurality of holes each offset from the central rotation axis;
    a plurality of elongated blades for cutting vegetation, the blades each having a distal end and a proximal end, each of the proximal ends having a hole for axial alignment with one of the plurality of holes in the main body;
    a plurality of pins each receivable through one of the main body holes and through one of the blade holes for pivotably attaching one of the blades to the main body; and
    a single pin cover for retaining all of the pins in the main body and the blade holes during operation of the trimmer attachment head, the single pin cover fitting loosely over all of the pins so as to constrain the pins axially but not laterally, the pin cover being a separate and detached piece from the main body, the main body, the pins and the pin cover cooperating to allow the blades to be removably attached to the main body quickly without tools, wherein the pin cover includes engagement means for engaging the main body to prevent rotation of the pin cover relative to the main body.

3. A trimmer attachment head for cutting vegetation comprising:
    a main body removably attachable to a vegetation cutting device, the main body being rotably drivable by the vegetation cutting device about a central rotation axis of the main body, the main body having a first hole offset from the central rotation axis;
    an elongated blade for cutting vegetation, the blade having a distal end and a proximal end, the proximal end having a second hole for axial alignment with the first hole;
    a pin receivable through the first and second holes for pivotably attaching the blade to the main body; and
    a pin cover for retaining the pin in the first and second holes during operation of the trimmer attachment head, the pin cover fitting loosely over the pin so as to constrain the pin axially but not laterally, the pin cover being a separate and detached piece from the main body, the main body, the pin and the pin cover cooperating to allow the blade to be removably attached to the main body quickly without tools,
    wherein the first hole of the main body includes an upper portion and a coaxial lower portion separated by a slot for receiving the blade, such that the pin protrudes from both a top side and a bottom side of the blade into the upper and lower portions of the first hole, wherein the first hole extends completely through the main body.

4. A trimmer attachment head for cutting vegetation comprising:

a main body removably attachable to a vegetation cutting device, the main body being rotably drivable by the vegetation cutting device about a central rotation axis of the main body, the main body having a first hole offset from the central rotation axis;

an elongated blade for cutting vegetation, the blade having a distal end and a proximal end, the proximal end having a second hole for axial alignment with the first hole;

a pin receivable through the first and second holes for pivotably attaching the blade to the main body; and a pin cover for retaining the pin in the first and second holes during operation of the trimmer attachment head, the pin cover fitting loosely over the pin so as to constrain the pin axially but not laterally, the pin cover being a separate and detached piece from the main body, the main body, the pin and the pin cover cooperating to allow the blade to be removably attached to the main body quickly without tools, wherein the first hole of the main body includes an upper portion and a coaxial lower portion separated by a slot for receiving the blade, such that the pin protrudes from both a top side and a bottom side of the blade into the upper and lower portions of the first hole, wherein the pin does not protrude above the upper portion or below the lower portion of the first hole in the main body.

5. A trimmer attachment head for cutting vegetation comprising:

a main body removably attachable to a vegetation cutting device, the main body being rotably drivable by the vegetation cutting device about a central rotation axis of the main body, the main body having a first hole offset from the central rotation axis;

an elongated blade for cutting vegetation, the blade having a distal end and a proximal end, the proximal end having a second hole for axial alignment with the first hole;

a pin receivable through the first and second holes for pivotably attaching the blade to the main body; and a pin cover for retaining the pin in the first and second holes during operation of the trimmer attachment head, the pin cover fitting loosely over the pin so as to constrain the pin axially but not laterally, the pin cover being a separate and detached piece from the main body, the main body, the pin and the pin cover cooperating to allow the blade to be removably attached to the main body quickly without tools, wherein the first hole of the main body includes an upper portion and a coaxial lower portion separated by a slot for receiving the blade, such that the pin protrudes from both a top side and a bottom side of the blade into the upper and lower portions of the first hole, wherein the pin cover includes a boss depending from a bottom side thereof for contacting only a top end surface of the pin.

* * * * *